United States Patent
Rudkevich

(10) Patent No.: US 6,347,164 B1
(45) Date of Patent: Feb. 12, 2002

(54) VARIABLE POLARIZATION DEPENDENT LOSS SOURCE

(75) Inventor: Eugene Rudkevich, 10088 E. Paseo San Rosendo, Tucson, AZ (US) 85747

(73) Assignee: Eugene Rudkevich, Tucson, AZ (US)

( * ) Notice: Subject to any disclaimer, the term of this patent is extended or adjusted under 35 U.S.C. 154(b) by 0 days.

(21) Appl. No.: 09/483,970

(22) Filed: Jan. 18, 2000

(51) Int. Cl.⁷ .................................................. G02B 6/27
(52) U.S. Cl. ........................................ 385/11; 359/483
(58) Field of Search ........................... 385/4.5, 11, 31, 385/33–35; 359/227, 230, 233, 234, 236, 433, 483, 485, 487, 489, 494

(56) References Cited

U.S. PATENT DOCUMENTS

| | | | | |
|---|---|---|---|---|
| 4,530,600 A | * | 7/1985 | Lopez | 356/5 |
| 5,561,726 A | * | 10/1996 | Yao | 385/11 |
| 5,740,288 A | * | 4/1998 | Pan | 385/11 |
| 6,266,474 B1 | * | 7/2001 | Han et al. | 385/140 |

* cited by examiner

*Primary Examiner*—Akm E. Ullah
*Assistant Examiner*—Michelle R. Connelly-Cushwa

(57) ABSTRACT

A fiber optic device that is capable of producing a variable amount of polarization dependent loss. The device consists of two lenses for coupling light out of the fiber and into the device and for coupling the light out of the device and into the fiber. The variable amount of PDL is produced by tilting two coated planar lenses in opposite direction. The tilt angle of both planar lenses remains equivalent during the tilting. The tilting action is achieved by a cam mechanism. In the manually operated embodiment of the invention, the cam is actuated by a shaft which can be rotated by a screwdriver. In automatically operated embodiment of the invention, the cam is actuated by a shaft which is connected through a clutch to a DC motor. The motor's position is measured by an encoder. A computerized procedure is used for device calibration.

2 Claims, 3 Drawing Sheets

VARIABLE POLARIZATION DEPENDENT LOSS SOURCE

BACKGROUND—FIELD OF INVENTION

This invention relates to components for fiber optic telecommunication, specifically to such devices that can impart a partial polarization on the optical signal. The magnitude of this polarization can be adjusted.

BACKGROUND—DESCRIPTION OF PRIOR ART

Many components used in fiber optic telecommunications systems impart a partial polarization on the optical signal. This characteristic is referred to as polarization dependent loss (PDL). This is an undesirable property that can lead to amplitude modulation distortion in analog fiber optic systems, and increased bit error rate in digital fiber optic systems. The fiber optic components that possess a significant amount of PDL include couplers, optical switches, isolators, and wavelength division multiplexing filters. The problem is further complicated by the fact that the combined PDL of a concatenation of several components in a fiber optic link does not stay constant but instead fluctuates. This is due to the fact that the optical fiber connecting the components randomly transforms the polarization of the optical signal. This random transformation is affected by external conditions such as temperature and the stress on the fiber, which varies with time. It is due to this time variation that the combined PDLs of all the components are a coupled randomly over time, to produce a time-varying overall PDL.

In order to mitigate the deleterious effects of PDL, it is necessary to be able to accurately measure, simulate, and if necessary compensate for PDL. For all of these applications it is desirable to have a device that can produce a specified amount of PDL. Two additional requirements would be that the PDL remains constant over a specified wavelength range, and that it would be possible to deterministically vary the amount of PDL that this device can produce. For PDL measurement, this device can act as a calibration reference for the measuring instrument. For simulation of PDL, this device can be inserted in the fiber optic link, and the performance of the link can be monitored as the PDL is varied. For compensation of PDL, the device is inserted into the fiber optic link along with a polarization controller. The polarization controller is adjusted until the PDL axis of the device is perpendicular to the PDL axis of the composite PDL of the fiber link. The PDL of the PDL source is then adjusted until the overall PDL of the link is reduced to zero.

To date, several approaches have been used to produce sources of PDL in fiber optic systems. They include sections of polarizing fiber, tilting glass plates, and a variable polarization beamsplitter. These methods and their disadvantages will now be described:

(a) PDL can be produced by a section of polarizing fiber. By varying the length of the section, a different amount of PDL can be produced. This method however suffers from a strong variation of PDL with the wavelength. It is also difficult to predict a priori the exact PDL of a section of fiber. Finally, the availability of polarizing fiber is very limited since a major supplier of polarizing fiber (3M) has recently stopped producing it.

(b) PDL can be produced by a variable polarization beam splitter. This is a liquid crystal device that splits a beam into orthogonal polarizations, with each polarization exiting into a separate fiber. Whether the orthogonal polarizations are completely split or just partially split can be adjusted. Thus both of the two paths act like partial polarizers, whose degree of polarization can be adjusted. This device can therefore be used to produce PDL. The main disadvantage of this device is the high insertion loss (~1.5 dB) that results due to the use of liquid crystals. This device also requires a voltage to operate and thus cannot be adjusted manually.

(c) PDL can be produced by one or more tilting glass plates. The preferred embodiment of the invention is based on this principal. When a light beam is incident on a tilted glass plate, the s and p polarized light is transmitted with different efficiencies. The magnitude of transmission of each component is dependent on the tilt angle of the plate. Thus a varying amount of PDL can be produced. When just a single plate is used, the light beam is laterally offset by an amount proportional to the tilt angle. This lateral offset makes coupling the light beam back into a fiber more difficult. In addition, if an uncoated glass plate is used, the insertion loss becomes excessively high and accurate adjustment of PDL is difficult since a small change in the tilt angle will result in a large change in PDL.

OBJECTS AND ADVANTAGES

Accordingly, several objects and advantages of the present invention are:

(a) to provide a fiber optic device with a variable amount of PDL which can be accurately adjusted manually or using an electric motor;

(b) to provide a fiber optic device with a variable amount of PDL, where the PDL does not vary significantly over the prescribed wavelength range of the input optical signal;

(c) to provide a fiber optic device with a variable amount of PDL where the insertion loss of the low loss axis of the device remains low.

(d) to provide a fiber optic device with a variable amount of PDL with compact dimensions.

Further objects and advantages will become apparent from a consideration of the ensuing description and drawings.

DRAWING FIGURES

In the drawings, closely related figures have the same number but different alphabetic suffixes.

Figure 1:
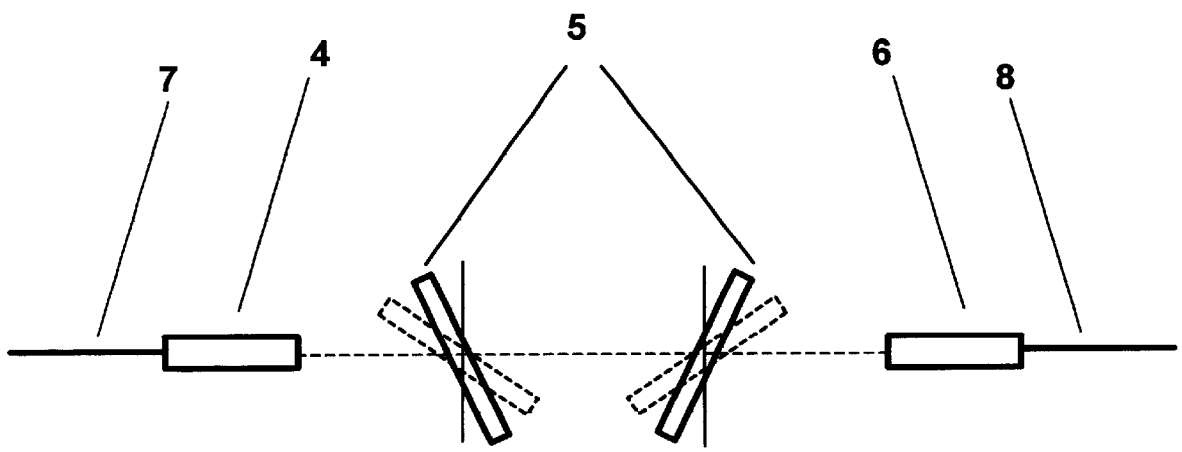
FIG. 1 shows a simplified version of the PDL source.

| Reference Numerals In drawings | |
|---|---|
| 4 input coupling lens | 5 planar lenses |
| 6 output coupling lens | 7 input optical fiber |
| 8 output optical fiber | 9 holder |
| 10 pin | 11 inner tube |
| 12 cam | 13 spring |
| 14 shaft | 15 screw |
| 16 shaft | 17 motor |
| 18 encoder | 19 clutch |

SUMMARY

In accordance with the present invention, a PDL source comprises two tilting coated planar lenses the angles of which can be varied using a cam mechanism.

Figure 2A:
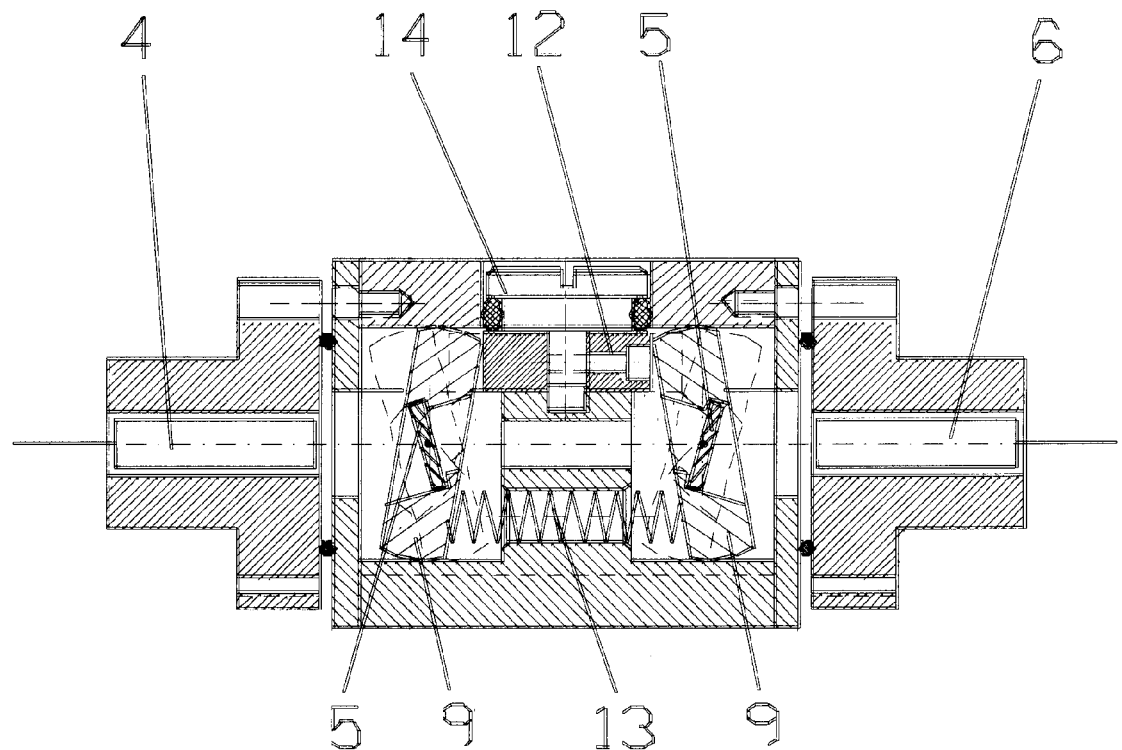
FIG. 2 shows the manually operated version of the PDL source.
Figure 2B:
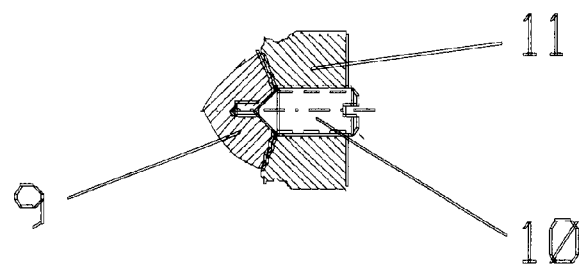

Description—FIGS. 1 to 3

A simplified version of a typical embodiment of the PDL source is illustrated in FIG. 1. The polarization dependent loss source is implemented by two tilting planar lenses 5 as shown in FIG. 1. The planar lenses 5 are placed between input 4 and output 6 coupling lenses. The coupling lenses 4 and 6 couple the optical signal from optical fiber 7 and back into optical fiber 8. The planar lenses 5 are anti-reflection coated so as to maximize the light transmission through the planar lenses 5. In addition, the anti-reflection coating allows for a larger tilting of the planar lenses to achieve the equivalent PDL change as for uncoated planar lenses. Thus the coatings facilitate a more accurate PDL adjustment. The anti-reflection coatings can also be designed such that a wavelength dependent PDL profile is produced. By controlling the tilt angle of the planar lenses, the degree of polarization induced by the planar lenses can be varied. As the tilt angle of the planar lenses 5 is increased, the degree of polarization is also increased. It is important that the tilt angle of both planar lenses is kept equivalent so as to preserve the focus alignment of coupling lenses 4 and 6. The tilting plates can alternatively be made of any dielectric material that is transparent in the wavelength region that the fiber link transmits.

A typical embodiment of the manual version of the PDL source is illustrated in FIG. 2. Light from a coupling lens 4 enters the device and impinges upon planar lenses 5 which are mounted on holders 9. The holders 9 are mounted by pins or set screws 10 on an inner tube 11. The mounting scheme allows the holders to be tilted with respect to the radial axis of the device. So as to achieve equivalent tilt in opposite directions, an oval cam 12 actuates the holders 9. As the oval cam 12 is rotated about an axis perpendicular to the radial axis of the device, the holders 9 are tilted at equivalent angles in opposite directions. The position of the holders 9 is constrained by a spring 13 during the tilting. The rotation of the oval cam 12 is actuated by a shaft 14, which can be accessed by a screwdriver exterior to the device. In this manner, the degree of polarization imparted onto the light can be varied.

Figure 3B:
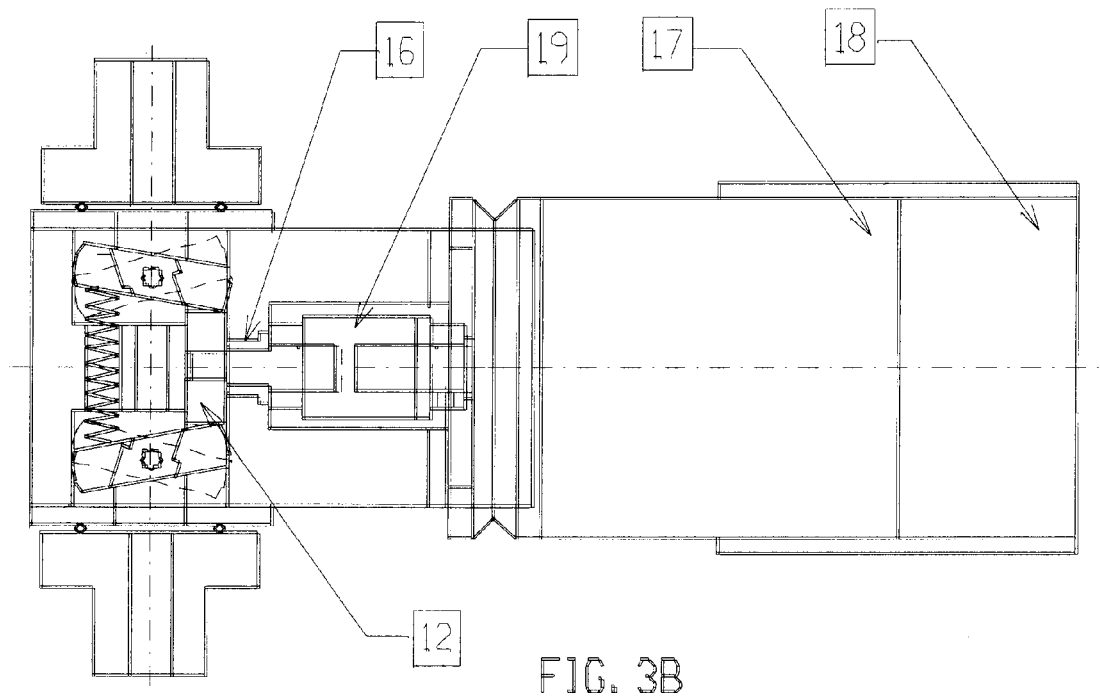
FIG. 3B shows the motorized version of the PDL source.
Figure 3A:
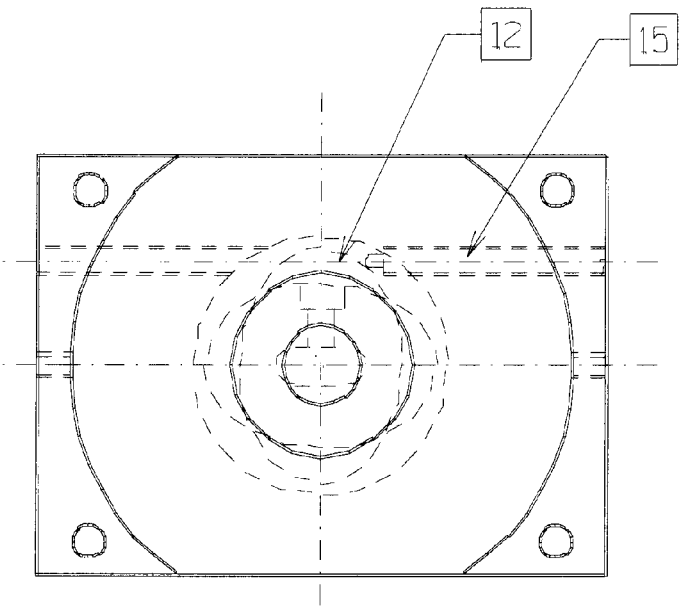
FIG. 3A shows the detail view of the cam and stop mechanism of the motorized PDL source

A typical embodiment of the motorized version of the PDL source is illustrated in FIGS. 3A and 3B. The mechanism for producing a variable amount of PDL remains the same as the embodiment illustrated in FIG. 2 with one exception. In the embodiment illustrated in FIG. 3A, a screw 15 acts as a stop for the cam 12. The position of the screw is adjusted such that the cam 12 impinges the screw 15 when the PDL of the device is at a minimum. In the embodiment illustrated in FIG. 3B, the shaft 16 is actuated by an electric motor 17, the relative position of which is measured by an encoder 18. The rotation of the motor is controlled by motor driver circuit and the encoder position is recorded by an encoder measuring circuit. Alternatively, the motor and the encoder can be replaced by a stepper motor or any other type actuator producing a rotating output, where the relative position of the rotating member can be determined. The motor driver circuit and the encoder measuring circuit are controlled by a computer. Alternatively, the computer can be replaced by a microprocessor based controller. The shaft 16 is coupled to the motor 17 through a clutch 19. The clutch 19 disengages the shaft 16 when a specified torque is reached. The necessity of the clutch will become apparent in the description of operation.

Operation—FIGS. 2,3

The manner of using the embodiment illustrated in FIG. 2 is as follows. In order to produce the desired value of PDL, the screw on top of the device is rotated. A rotation of the screw by 90 degrees will produce all possible values of PDL that the device can achieve.

The manner of using the embodiment illustrated in FIGS. 3A and 3B is as follows. Since the encoder 18 does not have the capability of measuring the absolute position of the motor 17, a known starting position must be determined. This is accomplished by a clutch 19 and a stop. The stop, depicted in FIG. 3A consists of screw 15, the position of which is adjusted so that the cam 12 impinges the screw when the tilt angle of the planar lenses 5 is such that the PDL of the device is at a minimum. To determine at which motor position the PDL of the device is at a minimum, the motor 17 rotates the cam 12 counterclockwise until the cam 12 impinges on the screw 15. At this point, the clutch 19 disengages the shaft, and the cam no longer rotates with the rotation of the motor. Once the motor 17 ceases to rotate in the counterclockwise direction, the clutch 19 will once again engage the shaft when the motor 17 rotates in the clockwise direction. With the rotation in the clockwise direction the encoder will measure the rotation. At this point a calibration procedure is performed in order to relate the PDL of the device to encoder 18 measurement. The procedure is as follows. At a known measurement of the encoder 18, the PDL of the device is measured. The computer then instructs the motor controller to rotate the motor 17 by a fixed increment. The encoder 18 measurement is recorded and the PDL value is measured. This procedure is repeated until all possible values of PDL have been measured and the relevant encoder 18 measurement has been recorded. This information is stored in a calibration file in the computer. When the user wishes to set the device at a specific PDL value, he or she enters this value into the computer and the computer instructs the motor controller to move the motor 17 until a corresponding decoder reading has been measured.

CONCLUSION, RAMIFICATIONS, AND SCOPE

Accordingly, the reader will see that the variable PDL source of this invention can be used to calibrate PDL measurement instrument. It can also be used to simulate PDL in fiber optic links. In addition it can be used for PDL compensation in conjunction with a polarization controller. Furthermore, the variable PDL source has the additional advantages in that It allows for adjustment of the PDL value;

The PDL value remains constant with changing wavelength;

The variable PDL source has low insertion loss;

The variable PDL source can be operated automatically or manually;

The variable PDL source is compact.

Although the description above contains many specificities, these should not be construed as limiting the scope of the invention but as merely providing illustrations of some of the presently preferred embodiments of this invention. For example, the actuator can be a piezoelectric motor and a different position measuring device can be used instead of the encoder; or the variable PDL source can also be integrated with a polarization controller to produce a PDL compensator, etc.

Thus the scope of the invention should be determined by the appended claims and their legal equivalents, rather than the examples given.

I claim:

1. A fiber optic variable polarization dependent loss device for impressing a variable inherent partial polarization on light passing therethrough, comprising:

(a) a first light path directing means;
(b) a second light path directing means;
(c) a plurality of optical components arranged relative to the first and second light path directing means for impressing a variable inherent partial polarization on light passing therethrough;

wherein the variable polarization dependent loss device comprises a planar lens forming a variable acute angle relative to the direction of light passing therethrough, comprising:
  (i) a mechanical adjusting means for varying the acute angle of the planar lens relative to the direction of light passing therethrough;
  (ii) an anti-reflection coating superimposed onto the planar lens.

2. A fiber optic variable polarization dependent loss device for impressing a variable inherent partial polarization on light passing therethrough, comprising:
(a) a first light path directing means;
(b) a second light path directing means;
(c) a plurality of optical components arranged relative to the first and second light path directing means for impressing a variable inherent partial polarization on light passing therethrough;

wherein the variable polarization dependent loss device comprises a planar lens forming a variable acute angle relative to the direction of light passing therethrough, comprising:
  (i) an electro-mechanical adjusting means for varying the acute angle of the planar lens relative to the direction of light passing therethrough comprising:
    a variable slip mechanism,
    a rotational electric actuator, and
    a position measuring means for the rotational electric actuator.

* * * * *